United States Patent
Carnick et al.

(10) Patent No.: US 11,142,147 B2
(45) Date of Patent: Oct. 12, 2021

(54) POWER DISTRIBUTION BOX ASSEMBLY FOR A VEHICLE

(71) Applicant: Sumitomo Wiring Systems, Ltd., Mie (JP)

(72) Inventors: Brian D. Carnick, Farmington Hills, MI (US); Christopher Alexander, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 188 days.

(21) Appl. No.: 16/456,438

(22) Filed: Jun. 28, 2019

(65) Prior Publication Data
US 2020/0406841 A1   Dec. 31, 2020

(51) Int. Cl.
*H02G 3/08* (2006.01)
*B60R 16/02* (2006.01)
*B60R 16/023* (2006.01)
*H02B 1/48* (2006.01)
*H02B 1/46* (2006.01)
*H02G 3/14* (2006.01)

(52) U.S. Cl.
CPC ...... *B60R 16/0238* (2013.01); *B60R 16/0215* (2013.01); *H02B 1/48* (2013.01); *H02B 1/46* (2013.01); *H02G 3/081* (2013.01); *H02G 3/086* (2013.01); *H02G 3/14* (2013.01)

(58) Field of Classification Search
CPC .......... H02G 3/08; H02G 3/081; H02G 3/088; H02G 3/14; H02G 3/086; H05K 5/00; H05K 5/02; H05K 5/0204; H05K 5/0217; H05K 5/03; H02B 1/48; H02B 1/46; B60R 16/0215; B60R 16/0238
USPC ....... 174/50, 520, 559, 17 R, 535, 560, 549; 439/76.1, 76.2, 535; 361/600, 601, 641, 361/679.1, 724
See application file for complete search history.

(56) References Cited

U.S. PATENT DOCUMENTS

| | | | | |
|---|---|---|---|---|
| 5,903,444 | A * | 5/1999 | Sekido | H01R 9/223 361/819 |
| 6,515,226 | B2 * | 2/2003 | Chiriku | B60R 16/0238 174/50 |
| 6,930,248 | B1 * | 8/2005 | Saka | H02G 3/086 174/50 |
| 7,121,847 | B1 * | 10/2006 | Jetton | H01R 13/527 439/76.2 |
| 7,799,991 | B1 * | 9/2010 | Advey | H01R 13/424 174/50 |

(Continued)

*Primary Examiner* — Angel R Estrada
(74) *Attorney, Agent, or Firm* — Honigman LLP

(57) ABSTRACT

A power distribution box assembly for a vehicle is provided. The power distribution box assembly includes a housing having a peripheral wall and an inner wall. The inner wall is dimensioned to hold electrical components. A cover is configured to cover the peripheral wall of the housing, and the cover has an interior surface. A first latching mechanism and a second latching mechanism are disposed opposite of the first latching mechanism. The first and second latching mechanisms are selectively operable between an engaged positon and a disengaged position. In the engaged position, the cover is closed onto the housing. A rib is disposed on a top surface of the inner wall of the housing. The rib abuts the interior surface of the cover when the first and second latching mechanisms are in the engaged position.

15 Claims, 9 Drawing Sheets

(56) References Cited

U.S. PATENT DOCUMENTS

| | | | |
|---|---|---|---|
| 7,878,357 B2* | 2/2011 | Yoshida | H02G 3/081 |
| | | | 174/50 |
| 8,723,035 B2* | 5/2014 | Warren | H02G 3/081 |
| | | | 174/50 |
| 8,884,160 B2* | 11/2014 | Hara | B60R 16/0238 |
| | | | 174/50 |
| 10,293,764 B2* | 5/2019 | Yamao | B60R 16/0215 |
| 10,903,634 B2* | 1/2021 | Miyamoto | B60R 16/0239 |

* cited by examiner

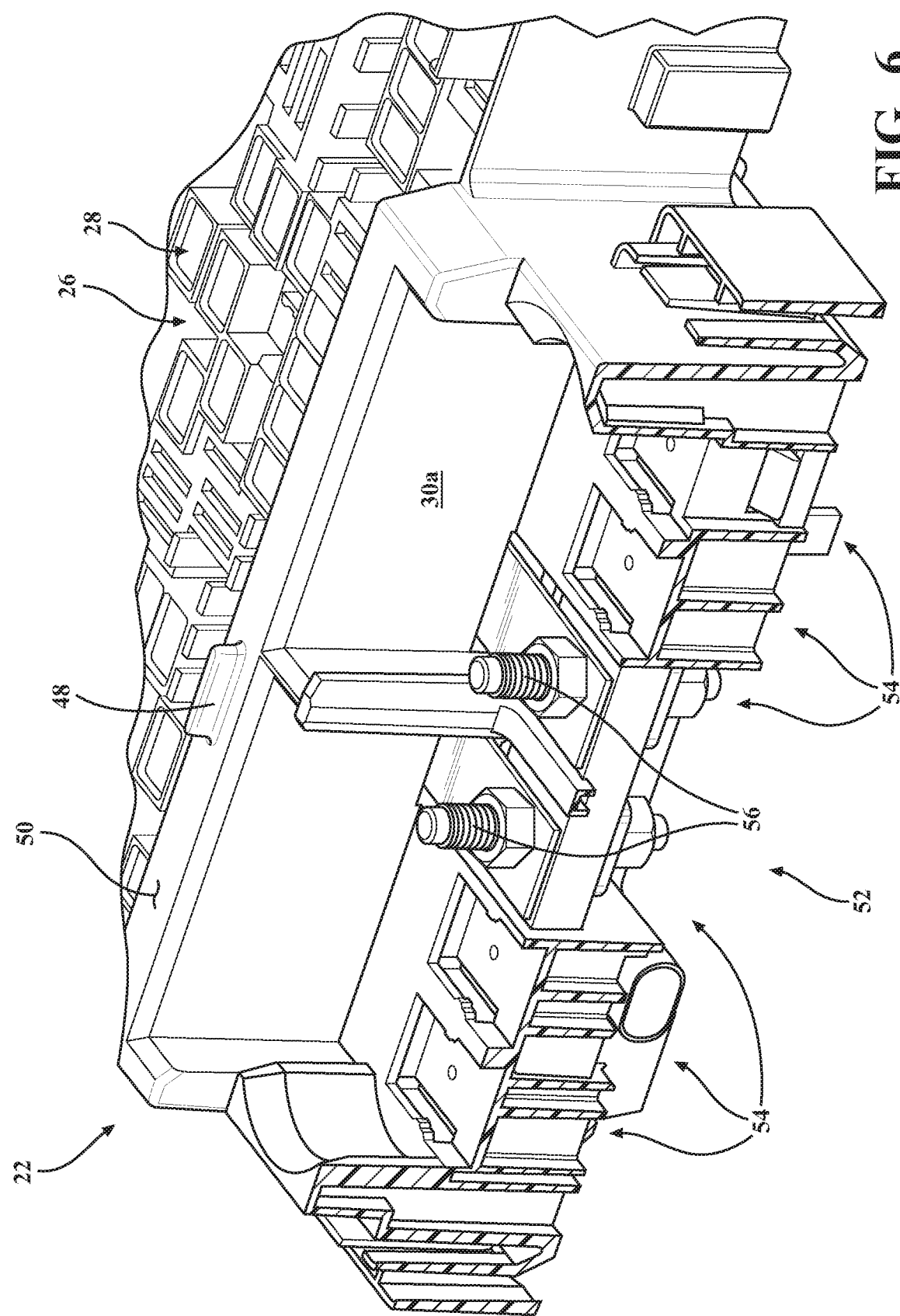

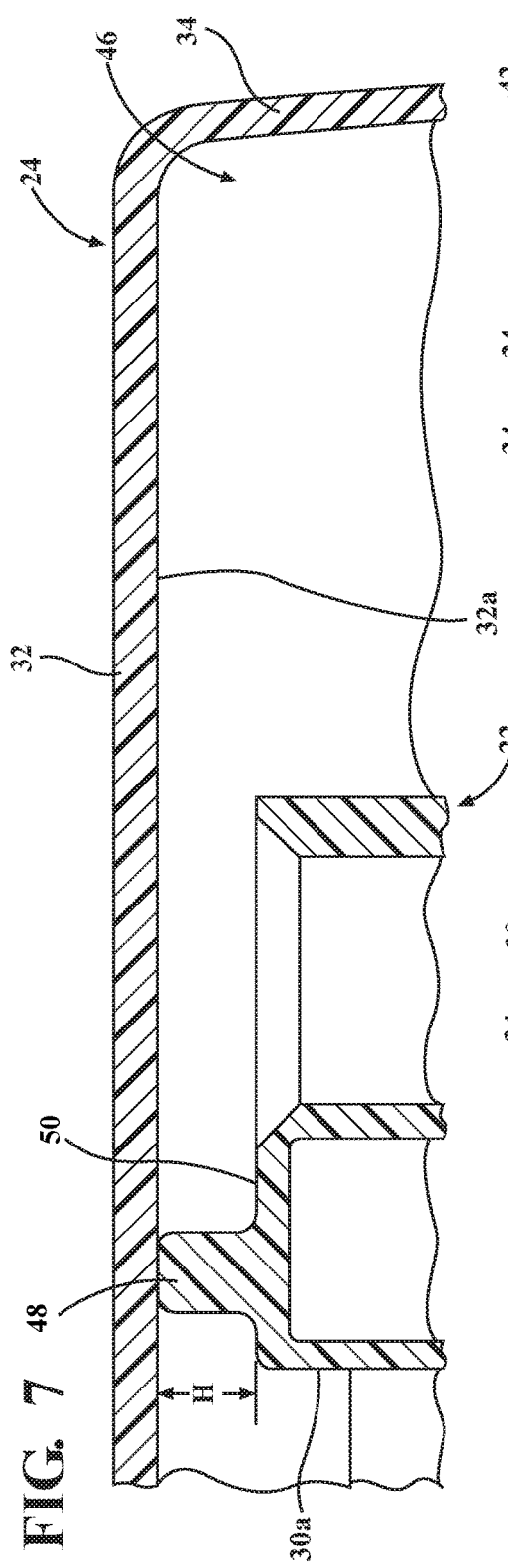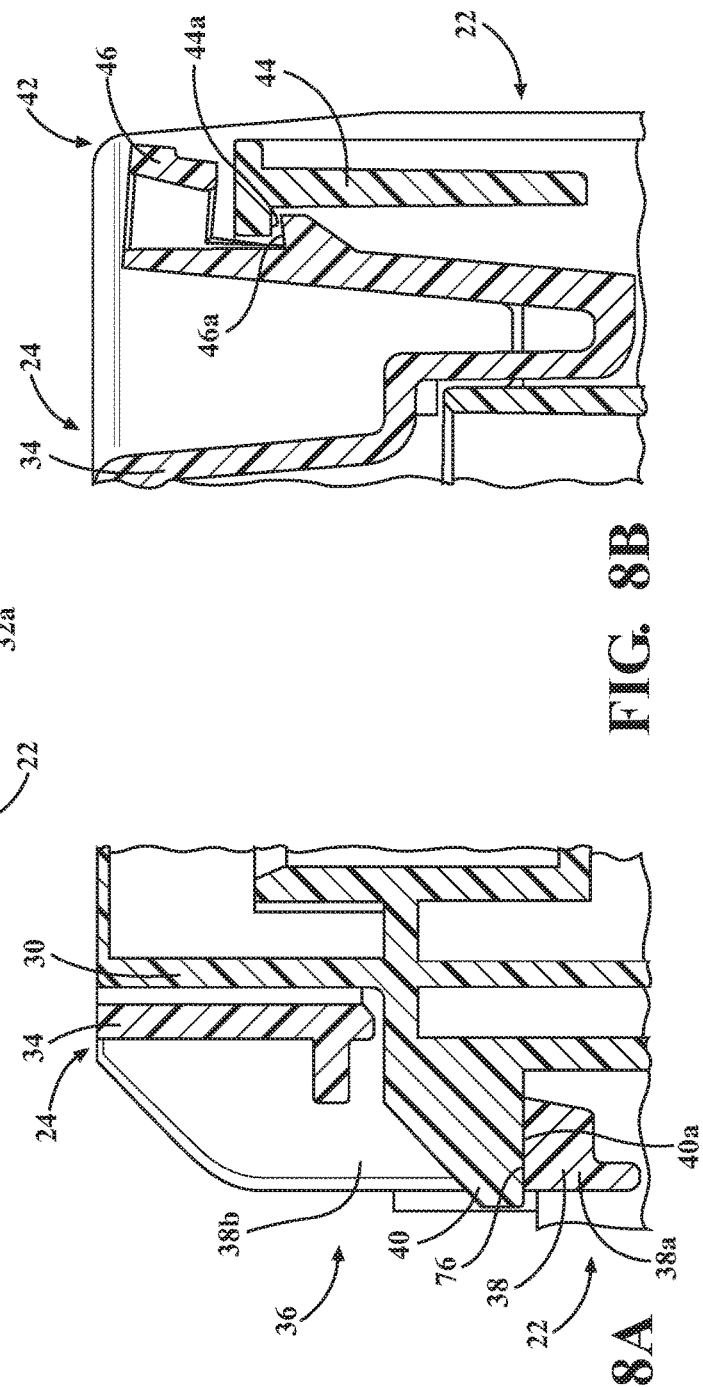

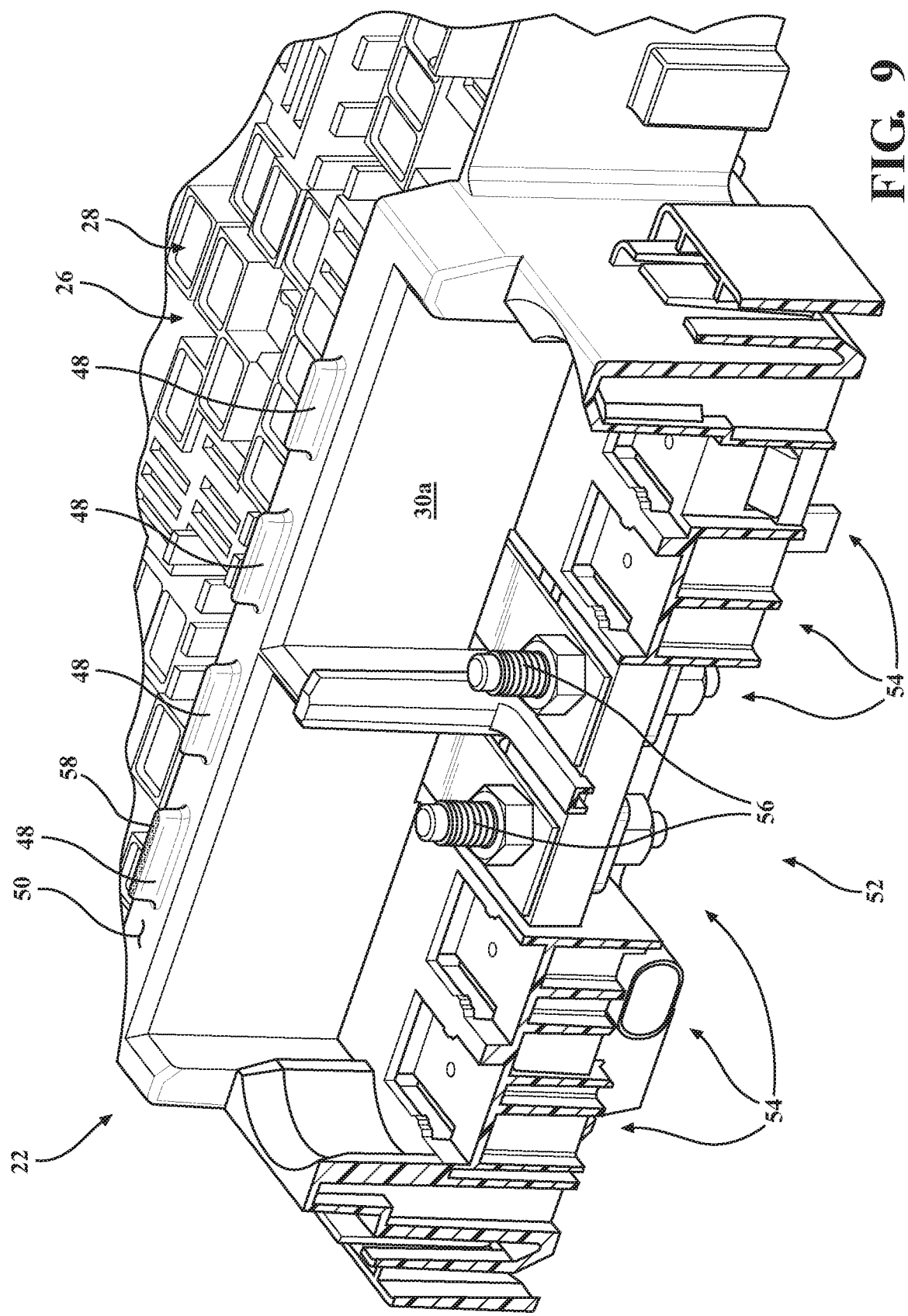

POWER DISTRIBUTION BOX ASSEMBLY FOR A VEHICLE

TECHNICAL FIELD

The present specification generally relates to power distribution boxes.

BACKGROUND

Vehicles, such as automobiles, may include a power distribution box assembly disposed in an engine bay, a trunk, or any other suitable location.

With reference now to FIG. 1, an illustration of a conventional power distribution box assembly 200 is provided. The power distribution box assembly 200 includes a housing 202 and a cover 204. A first latching mechanism 206 may engage the housing 202 and the cover 204. In assembly, the first latching mechanism 206 is engaged first, wherein the cover 204 may be rotated about the first latching mechanism 206 and closed onto the housing 202. The first latching mechanism 206 includes a U-shaped catch 208 configured to engage a tab 210. The U-shaped catch 208 is disposed on the cover and the U-shaped catch 208 is disposed on the housing 202.

The housing 202 and the cover 204 may each have sidewalls configured to provide a tolerance sufficient for the sidewall of the cover 204 to clear the sidewall of the housing 202 so the cover 204 may rotate toward the housing 202 until the first latching mechanism 206 is engaged, thus, a tolerance 66 (as indicated by the gap between the U-shaped catch 208 and the tab 210) is made.

When the first latching mechanism 206 is engaged, the tolerance 66 in the first latching mechanism 206 may allow the cover 204 to move relative to the housing 202. That is, the cover 204 may rattle with respect to the housing 202 at a distance equal to the tolerance 66.

During operation of the vehicle, the vehicle may experience vibrations. These vibrations may be caused by a variety of things, including forces travelling through the wheels to the body of the vehicle, uneven terrain, mechanical issues with the vehicle, etc. Consequently, the power distribution box assembly 200 may experience vibrations, which may cause the power distribution box assembly 200 to shake or rattle because of the presence of the tolerance 66. That is, the vibrations may cause the cover 204 to repeatedly move relative to the housing 202 at a distance equal to or less than the tolerance 66. The shaking or rattling may cause unwanted noise, increase the risk of damage or fracture to the power distribution box assembly 200, etc.

Accordingly, it remains desirable to have a power distribution box with little or no rattling during a vehicle's operation.

SUMMARY

A power distribution box assembly is provided. The power distribution box assembly includes a housing having a side wall bounding a cavity and a cover having a peripheral wall bounding a top wall. The top wall is configured to cover the cavity. The top wall has an inner surface. The power distribution box assembly further includes a first latching mechanism having a tolerance configured to allow the peripheral wall to clear the side wall when the cover is rotated onto the housing. A second latching mechanism is disposed opposite of the first latching mechanism. The first and second latching mechanisms are selectively operable between an engaged positon and a disengaged position. In the engaged position, the cover is closed onto the housing. A rib is disposed on a top surface of the side wall of the housing, and abuts the inner surface of the cover when the first and second latching mechanisms are in the engaged position. The rib eliminates the tolerance in the first latching mechanism by preventing the cover from dropping.

In one embodiment, the first latching mechanism includes a first latch disposed on one of the housing and the cover and a first catch disposed on the other of the housing and the cover, and the second latching mechanism includes a second latch disposed on one of the housing and the cover and a second catch disposed on the other of the housing and the cover. The first latching mechanism may be disposed on a rear wall of the housing and a rear wall of the cover. The second latching mechanism may be disposed on a front wall of the housing and a front wall of the cover.

When the first latching mechanism is in the engaged position, the first latch may be pivotally engaged with the first catch. The first latch may include a gap defined by a pair of legs spaced apart from each other and an engaging portion extending from one of the legs to the other of the legs, the gap dimensioned to receive the first catch. The first catch may be spaced from the engaging portion, defining the tolerance therebetween. The inner surface of the top wall of the cover may abut only the rib when the first latching mechanism is in the engaged position and the second latching mechanism is in the engaged position. The top wall may extend along a direction extending from the first latching mechanism to the second latching mechanism. The housing may be dimensioned to hold electric components, the electrical components including a terminal housing with eyelet terminals.

In one embodiment, a plurality of ribs may be disposed on the top surface of the side wall of the housing.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 6 is an isometric view of the housing of FIG. 5;

FIG. 7 is a cross-sectional view of a rib and the cover of the power distribution box of FIG. 2;

FIG. 8A is a cross-sectional view of the latching mechanism of FIGS. 2 and 4;

FIG. 8B is a cross-sectional view of the latching mechanism of FIGS. 2 and 3;

FIG. 9 is an isometric view of a housing of a power distribution box according to one or more embodiments described and illustrated herein.

DETAILED DESCRIPTION

Referring generally to the figures, embodiments of the present disclosure directed towards a power distribution box assembly are provided.

The power distribution box assembly may be disposed in a vehicle. For example, the power distribution box assembly may be disposed in an engine bay under a hood of the vehicle. As another example, the power distribution box assembly may be disposed in a trunk of the vehicle, or any other suitable location. The power distribution box assembly may include fuses, diodes, and other electrical components. The power distribution box assembly includes a cover and a housing. The power distribution box assembly includes a first latching mechanism having a tolerance configured to allow the cover to be rotated and attached to the housing and a rib mounted to a top surface of an inner wall of the cover, the rib being a height the same length of the tolerance so as to press the cover against the rib and prevent the cover and the housing from rattling. In other words, the rib prevents the cover from dropping and thus eliminates the tolerance.

Figure 2:
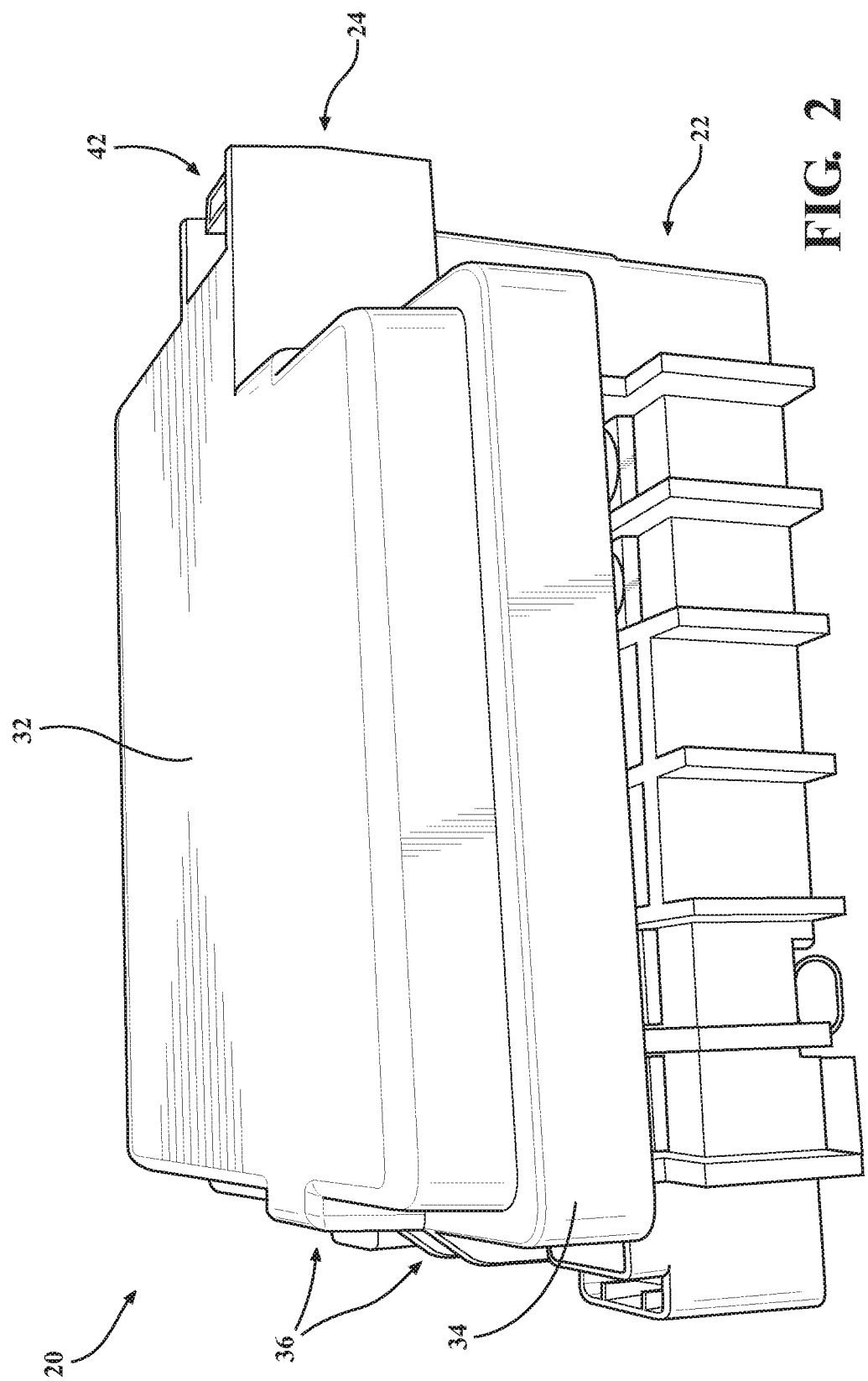
FIG. 2 is an isometric view of a power distribution box according to one or more embodiments described and illustrated herein.
Figure 5:
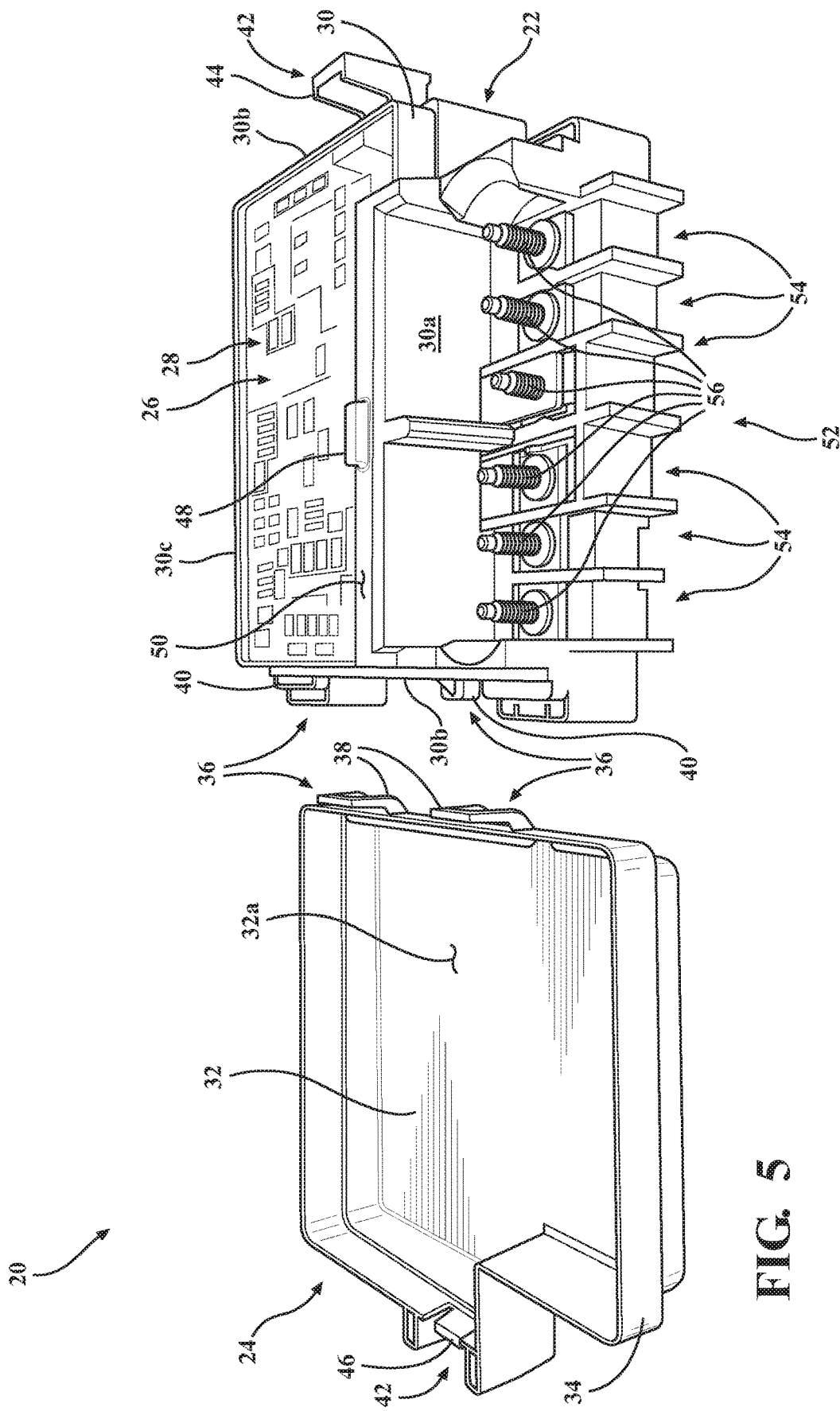
FIG. 5 is an isometric view of the power distribution box of FIGS. 2-4 with a cover removed.

With reference to FIGS. 2 and 5, a power distribution box assembly 20 includes a housing 22 and a cover 24. The housing 22 may have a generally rectangular cross-section. The housing 22 may define a housing cavity 26 having a generally rectangular shape. Disposed within the housing cavity 26 may be a plurality of electrical components 28. Such components may include fuses, electrical terminals, eyelet terminals, diodes, etc. The housing 22 may be formed of a plastic material, and the housing 22 may be formed by molding, extrusion, 3D printing or in any other suitable manner.

The housing 22 may include a side wall 30 extending around a perimeter of the housing 22. The side wall 30 includes a front surface 30a, a pair of side surfaces 30b and a back surface 30c. The cover 24 includes a top wall 32 and a peripheral wall 34 bounding the top wall 32 and is configured to cover the housing 22.

Figure 3:
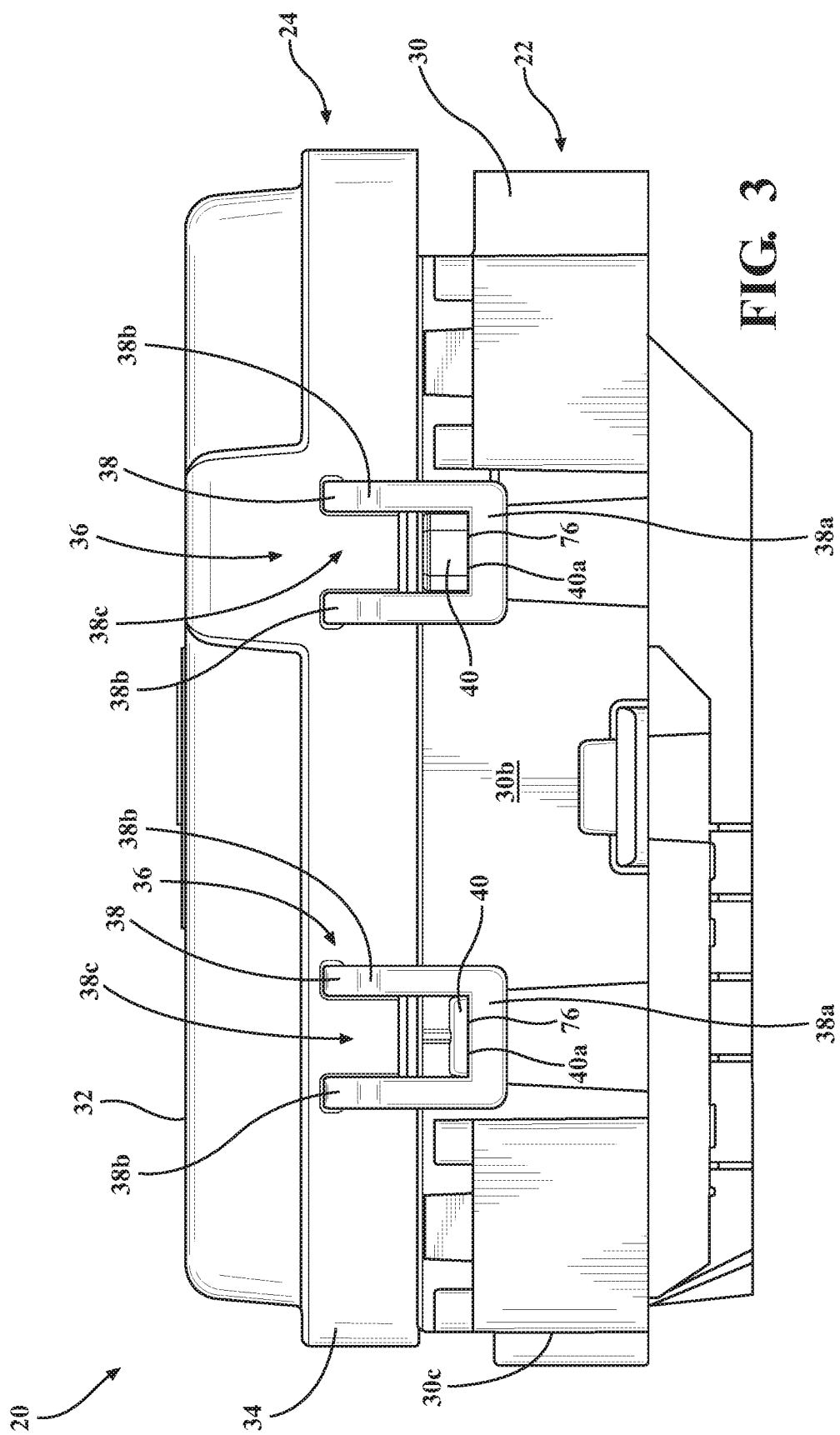
FIG. 3 is a plan view of a latching mechanism of the power distribution box of FIG. 2.

The power distribution box assembly 20 may include a first latching mechanism 36 disposed on the housing 22 and the cover 24, as shown in FIG. 3. The first latching mechanism 36 may include a U-shaped member 38 and a first locking tab 40. The U-shaped member 38 is illustratively shown as being disposed on the cover 24 and the first locking tab 40 is disposed on the housing 22. The U-shaped member 38 is configured to engage the first locking tab 40 to close the cover 24 onto the housing 22. The U-shaped member 38 has an engaging portion 38a which is a generally elongated member configured to engage the first locking tab 40.

For illustrative purposes, the power distribution box assembly 20 is shown as having a pair of first latching mechanisms 26 disposed on one of the side surfaces 30b of the side wall 30. The first latching mechanisms 26 are generally spaced apart from each other and identical to each other. As stated above, the first latching mechanism 36 is shown on one of the side surfaces 30b of the side wall 30. However, it should be appreciated that the location of the first latching mechanism 36 and the number of first latching mechanisms 26 are provided for illustrative purposes and are not limiting to the scope of the appended claims. For example, the first latching mechanism 36 may be disposed on the back surface 30c of the side wall 30 of the power distribution box assembly 20, and/or a single first latching mechanism 36 may be used to close the cover 24 onto the housing 22.

Figure 1:
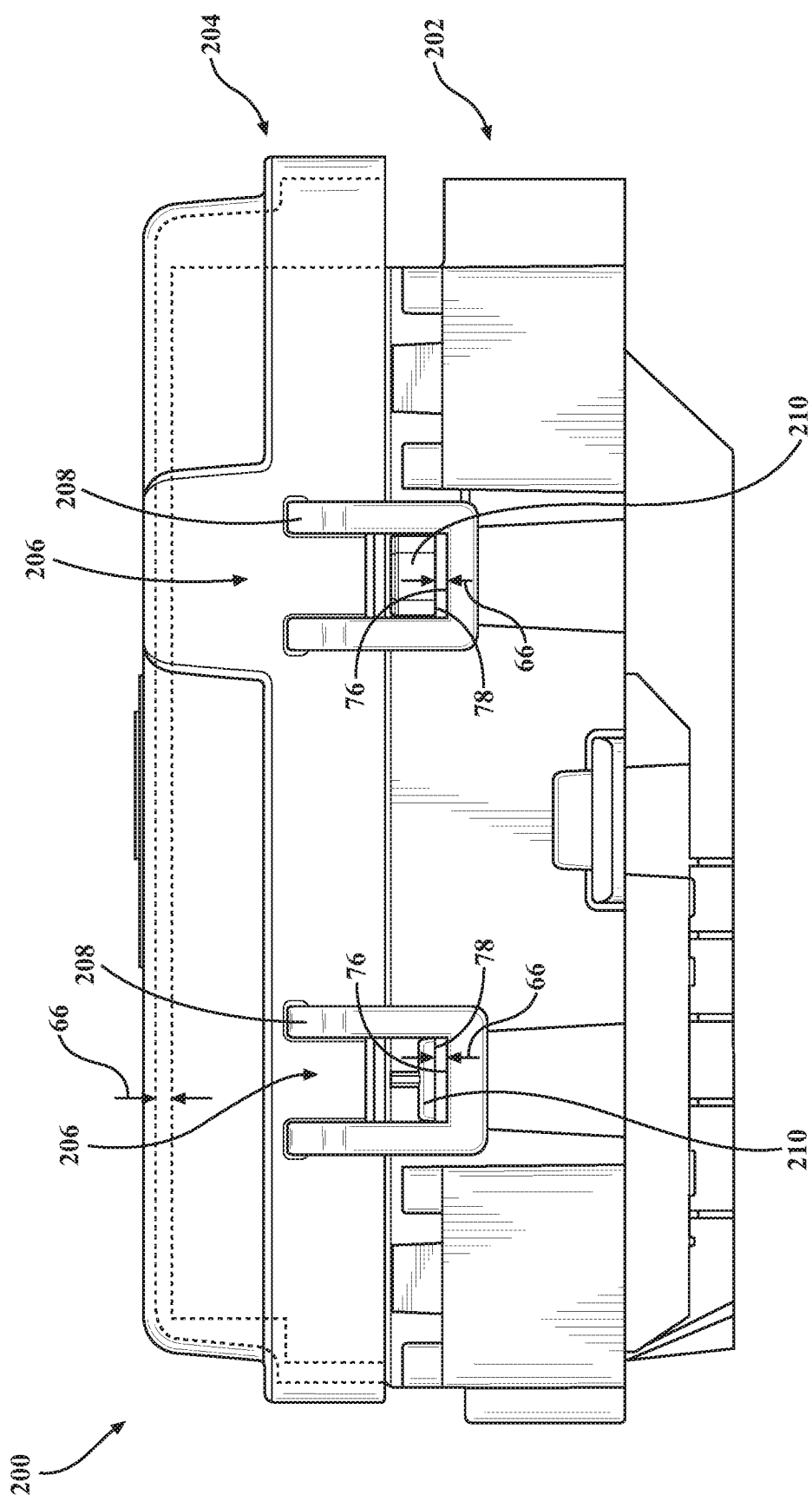
FIG. 1 schematically depicts a latching mechanism of the prior art.

The U-shaped member 38 includes a pair of legs 38b spaced apart from each other and the engaging portion 38a extending from one of the legs 38b to the other of the legs 38b so as to define a gap 38c. The gap 38c may be configured to receive the first locking tab 40. As in the Prior Art, as shown in FIG. 1, a tolerance exists between a top surface 76 of the engaging portion 38a of the U-shaped member 38 and a bottom surface 78 of the first locking tab 40. As with the Prior Art configuration, the tolerance allows for the cover 24 to be rotated onto the housing 22 so as to close the housing 22. As explained in greater detail below, the power distribution box assembly 20 is configured to eliminate the tolerance so as to prevent rattling between the cover 24 and the housing 22.

Figure 4:
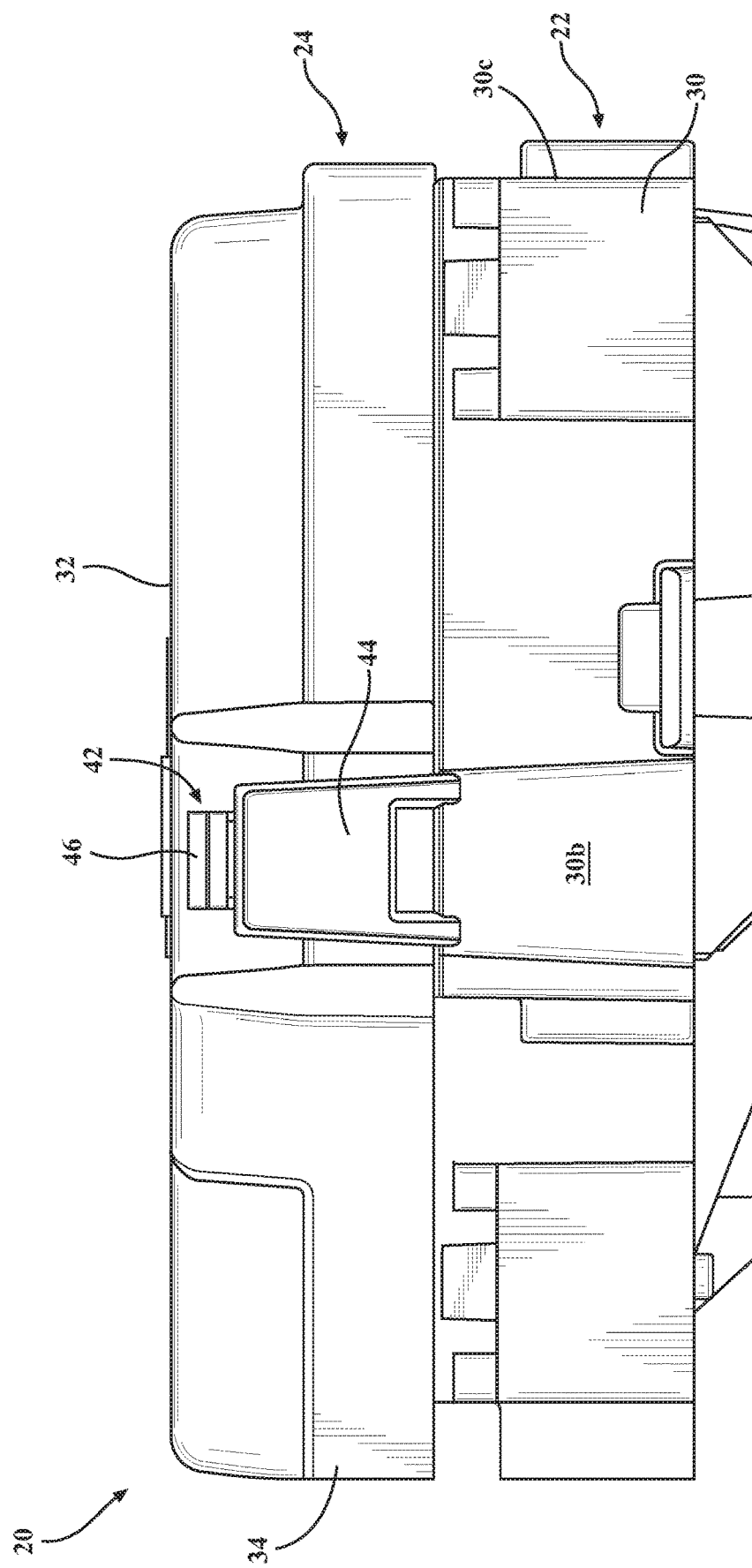
FIG. 4 is a plan view of another latching mechanism of the power distribution box of FIGS. 2 and 3.

A second latching mechanism 42 may be disposed opposite of the first latching mechanism 36, as shown in FIG. 4. For example, the first latching mechanism 36 may be disposed on one of the side surfaces 30b of the side wall 30 and the second latching mechanism 42 may be disposed on the other of the side surfaces 30b of the side wall 30. The second latching mechanism 42 may include a catch 44 disposed on the housing 22 and a latch 46 disposed on the cover 24. The latch 46 is made of a resilient material so as to allow the latch 46 to slide over the catch 44 and engage the catch 44. The second latching mechanism 42 is configured to close the cover 24 onto the housing 22. In one aspect of the second latching mechanism 42, shown in FIG. 8B, the latch 46 includes a bottom surface 46a and the catch 44 includes a top surface 44a. The top surface 44a and the bottom surface 46a are generally planar members configured to abut one another when the second latching mechanism 42 is engaged so as to close the cover 24 to the housing 22.

With reference again to FIG. 5 and now to FIGS. 6 and 7, the housing 22 further includes a rib 48. The rib 48 is disposed on a top surface 50 of a portion of the side wall 30 of the housing 22. In particular, the rib 48 is disposed on a portion of the front surface 30a of the side wall 30. FIG. 5 illustrates an aspect of the rib 48, wherein a longitudinal length of the rib 48 is orthogonal to the longitudinal length of the side surfaces 30b of the side wall 30 of the housing 22.

The housing 22 includes a terminal housing portion 52 configured to house a plurality of terminals 54 and threaded studs 56 for receiving a terminal connector so as to distribute power to various electric systems. The front surface 30a is recessed with respect to the terminal housing portion 52 so as to be disposed inwardly with respect to the peripheral wall 34 of the cover 24.

The rib 48 is a generally elongated member and may have a proximal end and a distal end spaced from the proximal end. The rib 48 may have a height "H". The height H has a length configured to equal the length of the tolerance between the top surface 40a of the first locking tabs 40 and the engaging portion 38a so as to press the top surface 40a of the first locking tabs 40 against the engaging portion 38a of the U-shaped member 38. In other words, the rib 48 has a height "H" configured to abut against an inner surface 32a of the top wall 32 of the cover 24. With reference again to FIG. 5, the rib 48 is elevated above a remaining top surface of the housing 22. That is, the rib 48 extends beyond the housing cavity 26 and the electrical components 28 so as to be the only structure to contact the inner surface 32a of the cover 24 when the first latching mechanism 36 and the second latching mechanism 42 are in the engaged position, as illustratively shown in FIG. 7.

FIG. 7 shows an aspect of the rib 48, wherein the rib 48 has a generally rectangular cross-section. However, it should be understood that the rib 48 may have any suitable cross-section. The height "H" of the rib 48 may be generally equal to or greater than the tolerance 66 between the U-shaped member 38 and the protrusion as shown in the prior art. FIG. 8A illustrates how the rib 48 urges the top surface 40a of the first locking tabs 40 against the engaging portion 38a of the U-shaped member 38 when the rib 48 engages the cover 24. The rib 48 is configured to eliminate the tolerance between the U-shaped member 38 and the first locking tab 40 by preventing the cover 24 from dropping onto the housing 22. Accordingly, during operation of a vehicle, the rattling between the cover 24 and the housing 22 is reduced.

Figure 10:
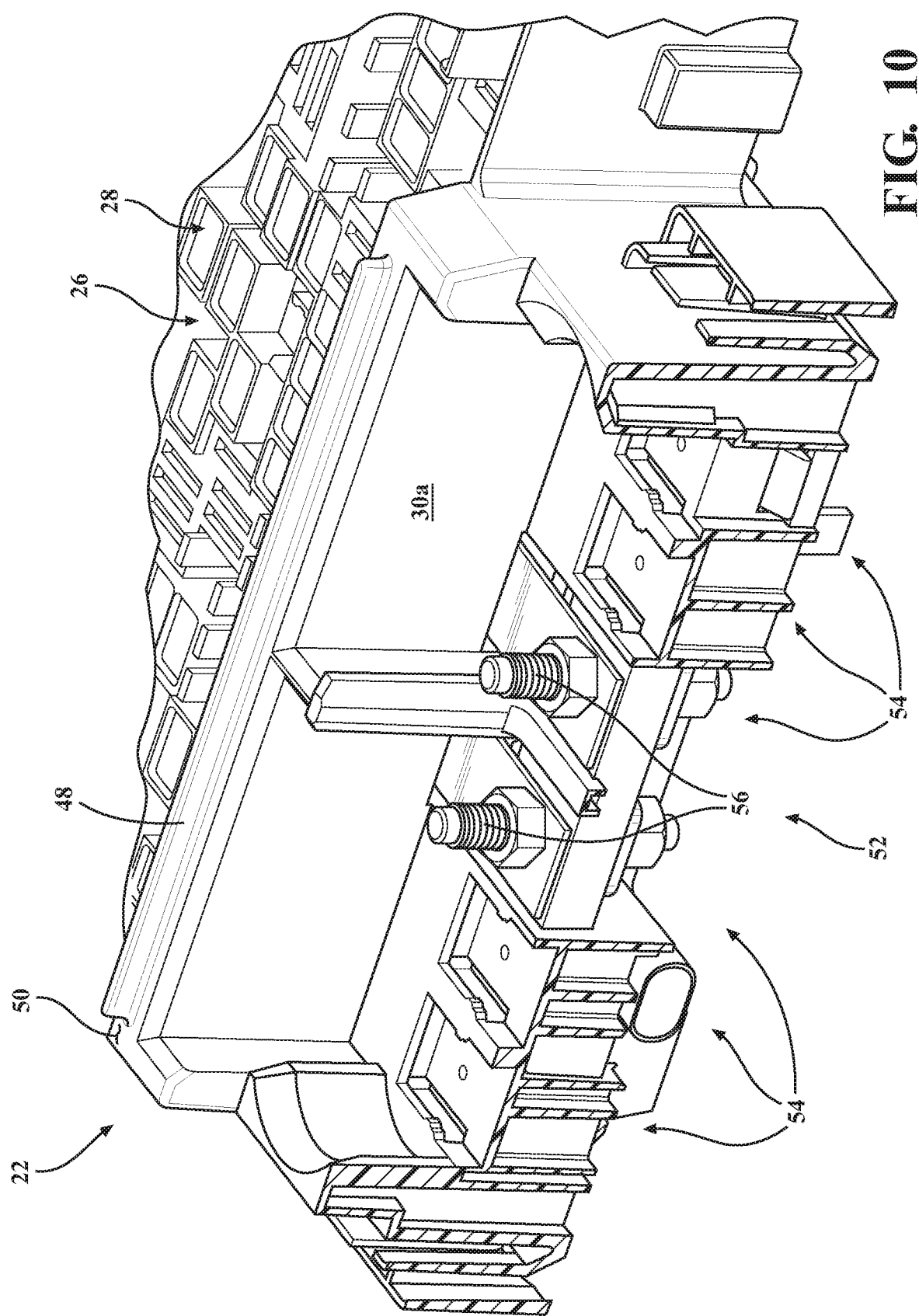
FIG. 10 is an isometric view of a housing of a power distribution box according to one or more embodiments described and illustrated herein.

With reference now to FIGS. 9 and 10, another aspect of the rib 48 is provided. FIG. 9 depicts an aspect of a power distribution box assembly 20 having a plurality of ribs 48. Each of the ribs 48 are generally identical to each other and are illustratively shown as being equally spaced apart from each other. FIG. 9 shows an embodiment wherein four ribs 48 are disposed on the top surface 50 of the front surface 30a of the side wall 30. FIG. 10 illustrates an embodiment wherein the rib 48 is longer than the ribs 48 shown in FIGS. 5 and 6. FIG. 10 illustrates that the rib 48 may extend along an entire length of the top surface 50 of the front surface 30a of the side wall 30.

The rib 48 may be formed of the same material as the housing 22. For example, the rib 48 may be molded with the housing 22. That is the rib 48 may be integral with the housing 22. For example, the rib 48 and the housing 22 may be one continuous piece. As another example, the rib 48 may be a separate component from the housing 22. In yet another aspect, the rib 48 may include a coating 58. The coating 58 may be a rubber material, a plastic material, a polymer or any suitable material. In such an aspect, the total height "H" of the rib 48, including the coating 58, is configured to eliminate the tolerance between the U-shaped member 38 and the first locking tab 40.

With reference again to FIGS. 2-10 an operation of the power distribution box assembly 20 is provided. The cover 24 and the housing 22 may be movable between a disengaged state (as shown in FIG. 5) and an engaged state (as shown in FIG. 2). The cover 24 may be attached to the housing 22 by first engaging the first latching mechanism 36. This may be done by engaging the U-shaped members 38 with the respective first locking tabs 40 such that the engaging portions 38a engages or abuts the top surface 40a of the first locking tabs 40. The cover 24 is then rotated about the first locking tabs 40 and closed onto the housing 22 wherein the second latching mechanism 42 is actuated, that is the catch 44 engages the latch 46. As described above, a tolerance is built into the first latching mechanism 36 to allow the peripheral wall 34 of the cover 24 to clear the side wall 30 of the housing 22 during rotation. When the cover 24 is closed onto the housing 22, the rib 48 abuts against the inner surface 32a of the top wall 32 of the cover 24 preventing the cover 24 from dropping onto the housing 22, thereby eliminating the tolerance and preventing the cover 24 and the housing 22 from rattling.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A power distribution box assembly comprising:
    a housing having a side wall bounding a cavity;
    a cover having a peripheral wall bounding a top wall, the top wall configured to cover the cavity, the top wall having an inner surface;
    a first latching mechanism having a tolerance configured to allow the peripheral wall to clear the side wall when the cover is rotated onto the housing, and a second latching mechanism disposed opposite of the first latching mechanism and selectively operable between an engaged positon and a disengaged position, wherein in the engaged position the cover is closed onto the housing; and
    a rib disposed on a top surface of the side wall of the housing, wherein an elongated portion of the side wall having the rib extends along a direction extending from the first latching mechanism to the second latching mechanism and wherein the rib abuts the inner surface of the cover when the first and second latching mechanisms are in the engaged position so as to eliminate the tolerance in the first latching mechanism.

2. The power distribution box assembly of claim 1, wherein the first latching mechanism includes a first latch disposed on one of the housing and the cover and a first catch disposed on the other of the housing and the cover, and the second latching mechanism includes a second latch disposed on one of the housing and the cover and a second catch disposed on the other of the housing and the cover.

3. The power distribution box assembly of claim 2, wherein the first latching mechanism is disposed opposite of the second latching mechanism.

4. The power distribution box assembly of claim 2, wherein when the first latching mechanism is in the engaged position, the first latch is pivotally engaged with the first catch.

5. The power distribution box assembly of claim 2, wherein the first latch includes a gap defined by a pair of legs spaced apart from each other and an engaging portion extending from one of the legs to the other of the legs, the gap dimensioned to receive the first catch, and wherein the first catch is spaced from the engaging portion, defining the tolerance therebetween.

6. The power distribution box assembly of claim 1, wherein the rib is elevated above a remaining top surface of the housing so as to be the only structure to contact the inner surface of the cover when the first latching mechanism and the second latching mechanism are in the engaged position.

7. The power distribution box assembly of claim 1, further comprising a plurality of ribs disposed on the top surface of the side wall of the housing.

8. The power distribution box assembly of claim 1, wherein the housing is dimensioned to hold electric components, the electrical components includes a terminal housing with eyelet terminals.

9. A power distribution box assembly comprising:
    a housing, having an inner wall;
    a cover having an interior surface facing the housing, the cover and the housing being selectively engageable with each other and operable between a disengaged position and an engaged position, wherein in the engaged position the cover is closed onto the housing;
    a first latch disposed on one of the housing and the cover and a first catch disposed on the other of the housing and the cover, and a second latch disposed on one of the housing and the cover and a second catch disposed on the other of the housing and the cover; and a rib abutting the interior surface of the cover when the cover and the housing are in the engaged position, wherein the rib is disposed on a top surface of the inner wall of the housing, and wherein the inner wall extends along a direction extending from the first latch to the second latch.

10. The power distribution box assembly of claim 9, wherein the first latch and the first catch are disposed opposite of the second latch and the second catch.

11. The power distribution box assembly of claim 9, wherein the first latch includes a gap defined by a pair of legs spaced apart from each other and an engaging portion extending from one of the legs to the other of the legs, the gap dimensioned to receive the first catch, and wherein the first catch is spaced from the engaging portion, defining a tolerance therebetween.

12. The power distribution box assembly of claim 9, wherein when the cover and the housing are in the engaged position, the first latch is pivotally engaged with the first catch.

13. The power distribution box assembly of claim 9, wherein the rib is elevated above a remaining top surface of the housing so as to be the only structure to contact the inner surface of the cover when the first latching mechanism and the second latching mechanism are in the engaged position.

14. The power distribution box assembly of claim 9, further comprising a plurality of ribs disposed on a top surface of an inner wall of the housing.

15. The power distribution box assembly of claim 9, wherein the housing is dimensioned to hold electric components, the electrical components includes a terminal housing with eyelet terminals.

* * * * *